(12) United States Patent
Suzuki et al.

(10) Patent No.: US 9,583,959 B2
(45) Date of Patent: Feb. 28, 2017

(54) CHARGING APPARATUS

(75) Inventors: Shin Suzuki, Kanagawa (JP); Yoichiro Tashiro, Tokyo (JP)

(73) Assignees: NEC CORPORATION, Tokyo (JP); NEC ENERGY DEVICES, LTD., Kanagawa (JP)

(*) Notice: Subject to any disclaimer, the term of this patent is extended or adjusted under 35 U.S.C. 154(b) by 629 days.

(21) Appl. No.: 13/820,696

(22) PCT Filed: Oct. 7, 2011

(86) PCT No.: PCT/JP2011/073229
§ 371 (c)(1),
(2), (4) Date: May 10, 2013

(87) PCT Pub. No.: WO2012/050062
PCT Pub. Date: Apr. 19, 2012

(65) Prior Publication Data
US 2013/0221907 A1    Aug. 29, 2013

(30) Foreign Application Priority Data

Oct. 12, 2010  (JP) ................................ 2010-229691

(51) Int. Cl.
H02J 7/04       (2006.01)
H02J 7/16       (2006.01)
H02J 7/00       (2006.01)
H01M 10/44      (2006.01)
H01M 10/0525    (2010.01)
H01M 10/48      (2006.01)

(52) U.S. Cl.
CPC ............. *H02J 7/007* (2013.01); *H01M 10/44* (2013.01); *H01M 10/443* (2013.01); *H02J 7/0091* (2013.01); *H01M 10/0525* (2013.01); *H01M 10/48* (2013.01); *H01M 10/486* (2013.01); *Y02T 10/7011* (2013.01)

(58) Field of Classification Search
CPC .......... H02J 7/007; H02J 7/047; H01M 10/443
USPC ................................................... 320/152–153
See application file for complete search history.

(56) References Cited

U.S. PATENT DOCUMENTS 5,623,195 A     4/1997  Bullock et al.
5,708,348 A *   1/1998  Frey ...................... H02J 7/0093
                                                       320/145

(Continued)

FOREIGN PATENT DOCUMENTS

CN    101421634 A    4/2009
EP    2178187 A1     4/2010

(Continued)

OTHER PUBLICATIONS

Communication dated Nov. 4, 2014 from the State Intellectual Property Office, P.R. China in counterpart Patent Application No. 201180049428.x.

(Continued)

*Primary Examiner* — Richard Isla Rodas
*Assistant Examiner* — David V Henze-Gongola
(74) *Attorney, Agent, or Firm* — Sughrue Mion, PLLC

(57) ABSTRACT

A controller (130) reads out a voltage value correlated with the ambient temperature of a battery (200) measured by a temperature measurer (110) from a storage device (120), so that a charger (140) charges the battery (200) at the voltage value read out by the controller (130).

12 Claims, 11 Drawing Sheets

| charging voltage value \ temperature | 25°C | 35°C | 45°C |
|---|---|---|---|
| 3.9V | B | C | C |
| 4.1V | A | B | B |
| 4.2V | A | A | B |

(56) References Cited

U.S. PATENT DOCUMENTS

| | | | | |
|---|---|---|---|---|
| 5,869,969 A * | 2/1999 | Cividino et al. | ............... | 320/153 |
| 2001/0015636 A1 * | 8/2001 | Yagi | ...................... | H02J 7/0075 |
| | | | | 320/132 |
| 2004/0222768 A1 * | 11/2004 | Moore | ................... | H02J 7/0075 |
| | | | | 320/128 |
| 2008/0278111 A1 * | 11/2008 | Genies | ................... | H02J 7/0073 |
| | | | | 320/101 |
| 2010/0176768 A1 * | 7/2010 | Kimura et al. | ............... | 320/152 |
| 2011/0037438 A1 * | 2/2011 | Bhardwaj | .............. | H02J 7/0073 |
| | | | | 320/152 |

FOREIGN PATENT DOCUMENTS

| | | | |
|---|---|---|---|
| JP | 576140 | A | 3/1993 |
| JP | 5-88154 | U | 11/1993 |
| JP | 588154 | | 11/1993 |
| JP | 9-163624 | A | 6/1997 |
| JP | 2001-176559 | A | 6/2001 |
| JP | 2002-204175 | A | 7/2002 |
| JP | 2005-278334 | A | 10/2005 |
| JP | 2006-196296 | A | 7/2006 |
| JP | 200816229 | A | 1/2008 |
| JP | 2010-68579 | A | 3/2010 |
| WO | 9609677 | A1 | 3/1996 |

OTHER PUBLICATIONS

Communication dated Jun. 17, 2014 from the Japanese Patent Office in counterpart Japanese Patent Application No. 2010229691.
Communication dated Oct. 19, 2016, from the European Patent Office in counterpart European Application No. 11832497.9.

* cited by examiner

Fig.1

| charging voltage value \ temperature | 25°C | 35°C | 45°C |
|---|---|---|---|
| 3.9V | B | C | C |
| 4.1V | A | B | B |
| 4.2V | A | A | B |

Fig.3

| temperature | float charging voltage value |
|---|---|
| lower than 30°C | 3.9V |
| from 30°C to lower than 40°C | 4.1V |
| 40°C and higher | 4.2V |

Fig.5

| temperature | SOC |
|---|---|
| lower than 30°C | 93% |
| from 30°C to lower than 40°C | 98% |
| 40°C and higher | 100% |

Fig.8

| month | float charging voltage value |
|---|---|
| December, January, February, March | 3.9V |
| April, May, October, November | 4.1V |
| June, July, August, September | 4.2V |

Fig.10

| month | SOC |
|---|---|
| December, January, February, March | 93% |
| April, May, October, November | 98% |
| June, July, August, September | 100% |

CHARGING APPARATUS

CROSS REFERENCE TO RELATED APPLICATIONS

This application is a National Stage of International Application No. PCT/JP2011/073229 filed Oct. 7, 2011, claiming priority based on Japanese Patent Application No. 2010-229691 filed Oct. 12, 2010, the contents of all of which are incorporated herein by reference in their entirety.

TECHNICAL FIELD

The present invention relates to a charging apparatus for charging a battery, a charging method, and a program.

BACKGROUND ART

In recent years, there has been a growing concern about environmental problems in a variety of fields.

In the field of electrical power supply, among others, power supply by means of, for example, PV (Photo Voltanic) power generation and by the utilization of a secondary battery used in an electric vehicle (EV: Electric Vehicle) or a hybrid electric vehicle (HEV: Hybrid EV) has become a focus of attention. As such a secondary battery, a lithium-ion secondary battery is considered promising. The second battery is expected to replace of lead storage batteries and the like as the battery grows popular in future.

On the other hand, the service life of a lithium secondary battery is dependent on the ambient temperature thereof at the time of charging.

Hence, a study is being made of a technique extending battery life by controlling the ambient temperature of a battery by using a peltiert element (see, for example, Patent Literature 1).

CITATION LIST

Patent Literature

Patent Literature 1: JP2006-196296A

SUMMARY OF INVENTION

Technical Problem

However, use of such a technique as described in Patent Literature 1 creates an issue in which the amount of money required to control ambient temperature is considerable. Another problem is that such cooling requires a great deal of energy.

An object of the present invention is to provide a charging apparatus, a charging method and a program in which the above-described problems are solved and which is capable of extending battery life.

Solution to Problem

A charging apparatus of the present invention for charging a battery includes:

a temperature measurer that measures the ambient temperature of the battery;

a storage device that correlates the ambient temperature with a voltage value in advance and stores the correlation;

a controller that reads out the voltage value correlated with the temperature measured by the temperature measurer from the storage device; and a charger that charges the battery at the voltage value read out by the controller.

A charging method of the present invention for charging a battery includes:

a measurement step of measuring the ambient temperature of the battery; and a charging step of charging the battery at a voltage value correlated with the measured temperature.

A program of the present invention for execution by a charging apparatus for charging a battery allows the charging apparatus to execute:

a measurement procedure of measuring the ambient temperature of the battery; and a charging procedure of charging the battery at a voltage value correlated with the measured temperature.

Advantageous Effect of the Invention

As describe above, in the present invention, it is possible to easily extend battery life.

BRIEF DESCRIPTION OF THE DRAWINGS

FIG. 1 is a table showing, as an experimental result, one example of the degrees of deterioration with respect to charging voltage values at three temperature values.

FIG. 3 is a drawing illustrating one example of the correlation between temperatures and voltage values stored in a storage device illustrated in FIG. 2.

FIG. 5 is a drawing illustrating one example of the correlation between temperatures and SOCs stored in the storage device illustrated in FIG. 2.

FIG. 8 is a drawing illustrating one example of the correlation between months and voltage values stored in the storage device illustrated in FIG. 7.

FIG. 10 is a drawing illustrating one example of the correlation between months and SOCs stored in the storage device illustrated in FIG. 7.

DESCRIPTION OF EMBODIMENTS

Figure 2:
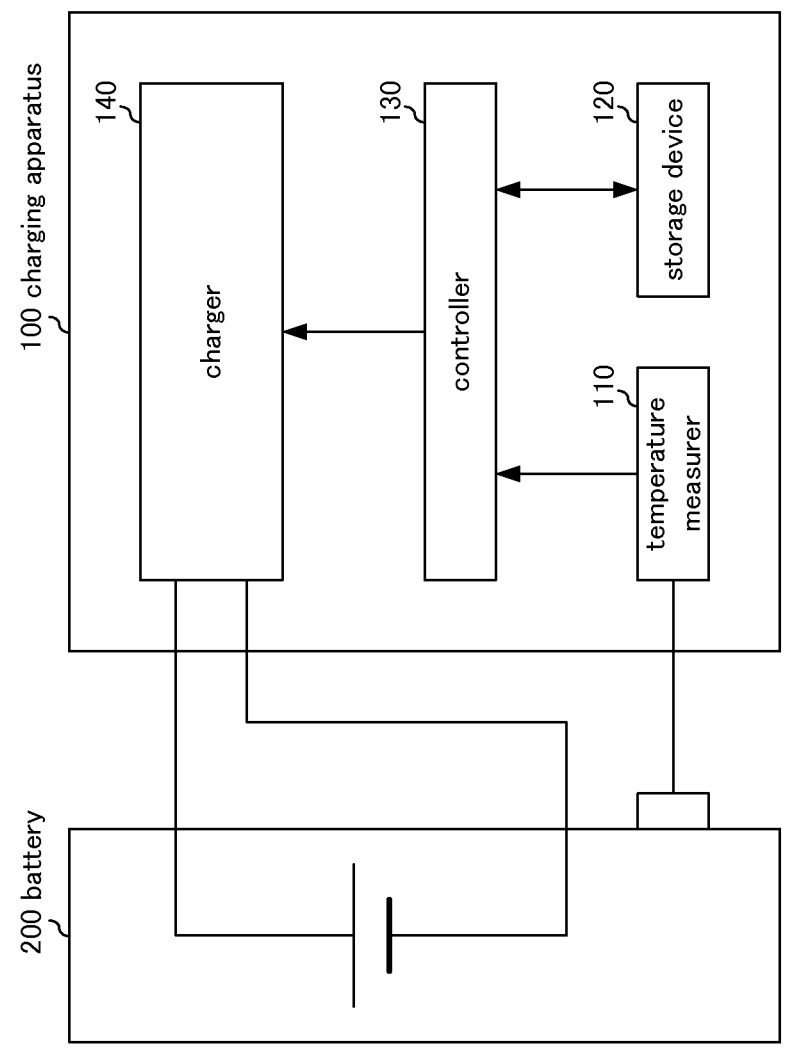
FIG. 2 is a drawing illustrating a first exemplary embodiment of the charging apparatus of the present invention.

An experimental result has been obtained in which the ambient temperature of a secondary battery at the time of charging the battery and the charging voltage value at that time are related to the degree of battery deterioration.

Specifically, an experimental result has been obtained in which the degree of deterioration under the condition of a charging voltage value being generally regarded as a high level is marginal when the ambient temperature of the battery is low, whereas deterioration due to the charging voltage value being low accelerates when the ambient temperature of the battery is high.

FIG. 1 is a table showing, as an experimental result, one example of the degrees of deterioration with respect to charging voltage values at three temperature values.

The table illustrated in FIG. 1 shows the degrees of deterioration at the ambient temperature values of a battery of 25° C., 35° C. and 45° C. when the charging voltage values are 3.9 V, 4.1 V and 4.2 V. Here, the degrees of deterioration are denoted by "A", "B" and "C". The degree of deterioration "A" indicates that the degree of deterioration of the battery is low. The degree of deterioration "B" indicates that the degree of deterioration of the battery is moderate. The degree of deterioration "C" indicates that the degree of deterioration of the battery is high.

For example, if the charging voltage value is 3.9 V and the ambient temperature of the battery is 25° C., the degree of deterioration is "B". This indicates that if the battery is charged at a charging voltage value of 3.9 V when the ambient temperature of the battery is 25° C., the degree of deterioration of the charged battery is "B". Likewise, if the charging voltage value is 3.9 V and the ambient temperature of the battery is 35° C., the degree of deterioration is "C". This indicates that if the battery is charged at a charging voltage value of 3.9 V when the ambient temperature of the battery is 35° C., the degree of deterioration of the charged battery is "C". Still likewise, if the charging voltage value is 3.9 V and the ambient temperature of the battery is 45° C., the degree of deterioration is "C". This indicates that if the battery is charged at a charging voltage value of 3.9 V when the ambient temperature of the battery is 45° C., the degree of deterioration of the charged battery is "C".

If the charging voltage value is 4.1 V and the ambient temperature of the battery is 25° C., the degree of deterioration is "A". This indicates that if the battery is charged at a charging voltage value of 4.1 V when the ambient temperature of the battery is 25° C., the degree of deterioration of the charged battery is "A". Likewise, if the charging voltage value is 4.1 V and the ambient temperature of the battery is 35° C., the degree of deterioration is "B". This indicates that if the battery is charged at a charging voltage value of 4.1 V when the ambient temperature of the battery is 35° C., the degree of deterioration of the charged battery is "B". Yet likewise, if the charging voltage value is 4.1 V and the ambient temperature of the battery is 45° C., the degree of deterioration is "B". This indicates that if the battery is charged at a charging voltage value of 4.1 V when the ambient temperature of the battery is 45° C., the degree of deterioration of the charged battery is "B".

If the charging voltage value is 4.2 V and the ambient temperature of the battery is 25° C., the degree of deterioration is "A". This indicates that if the battery is charged at a charging voltage value of 4.2 V when the ambient temperature of the battery is 25° C., the degree of deterioration of the charged battery is "A". Likewise, if the charging voltage value is 4.2 V and the ambient temperature of the battery is 35° C., the degree of deterioration is "A". This indicates that if the battery is charged at a charging voltage value of 4.2 V when the ambient temperature of the battery is 35° C., the degree of deterioration of the charged battery is "A". Yet likewise, if the charging voltage value is 4.2 V and the ambient temperature of the battery is 45° C., the degree of deterioration is "B". This indicates that if the battery is charged at a charging voltage value of 4.2 V when the ambient temperature of the battery is 45° C., the degree of deterioration of the charged battery is "B".

This result agrees well with the latest theory in which positive-electrode deterioration accelerates at elevated temperatures when the charging voltage value is low.

Although positive-electrode deterioration occurs when the temperature is normal or low, the degree of deterioration in the positive-electrode corresponds to the degree to which the electrolyte has deteriorated. Accordingly, the electrolyte deterioration is prevented by setting the voltage value low. On the other hand, if the voltage value is set low when the temperature is high, the positive-electrode deterioration becomes pronounced.

Hence, extending battery life is realized by the present invention.

Hereinafter, exemplary embodiments of the present invention will be described with reference to the accompanying drawings.

First Exemplary Embodiment

FIG. 2 is a drawing illustrating a first exemplary embodiment of the charging apparatus of the present invention.

As illustrated in FIG. 2, charging apparatus 100 of the present exemplary embodiment is provided with temperature measurer 110, storage device 120, controller 130, and charger 140. In addition, charging apparatus 100 is connected to rechargeable battery 200.

Temperature measurer 110 is a thermometer for measuring the ambient temperature of battery 200. Temperature measurer 110 notifies measured temperature to controller 130.

Storage device 120 correlates temperature values with voltage values used to charge battery 200 to store the correlation. This correlation is written into storage device 120 from the outside in advance. Note that storage device 120 correlates higher voltage values with higher temperature values and the correlation is stored.

FIG. 3 is a drawing illustrating one example of the correlation between temperatures and voltage values stored in the storage device illustrated in FIG. 2. Here, a description will be made by citing an example in which the voltage values are float charging voltage values.

As illustrated in FIG. 3, a plurality of temperature ranges are correlated with float charging voltage values and the correlation is stored in storage device 120 illustrated in FIG. 2.

For example, a temperature range lower than 30° C. is correlated with a float charging voltage value of 3.9 V and the correlation is stored. Likewise, a temperature range from 30° C. to lower than 40° C. is correlated with a float charging voltage value of 4.1 V and the correlation is stored. Yet likewise, a temperature range of 40° C. and higher is correlated with a float charging voltage value of 4.2 V and the correlation is stored. From these correlations, a float charging voltage value is read out by controller 130 according to a temperature value.

Controller 130 reads out a voltage value (float charging voltage value in the example shown in FIG. 3) corresponding to a temperature value notified from temperature measurer 110 from storage device 120.

For example, if the temperature value notified from temperature measurer 110 is 25° C., a float charging voltage value of 3.9 V correlated with a temperature range lower than 30° C. is read out since the temperature value 25° C. belongs to the temperature range lower than 30° C. in storage device 120. Likewise, if the temperature value notified from temperature measurer 110 is 35° C., a float charging voltage value of 4.1 V correlated with a temperature range from 30° C. to lower than 40° C. is read out since the temperature value 25° C. belongs to the temperature range from 30° C. to lower than 40° C. in storage device 120. Yet likewise, if the temperature value notified from temperature measurer 110 is 45° C., a float charging voltage value of 4.2 V correlated with a temperature range of 40° C. and higher is read out since the temperature value 45° C. belongs to the temperature range of 40° C. and higher in storage device 120.

Controller 130 notifies the voltage value read out from storage device 120 to charger 140.

Charger 140 charges battery 200 at the voltage value notified from controller 130.

Hereinafter, a description will be made of a charging method in the first exemplary embodiment.

Figure 4:
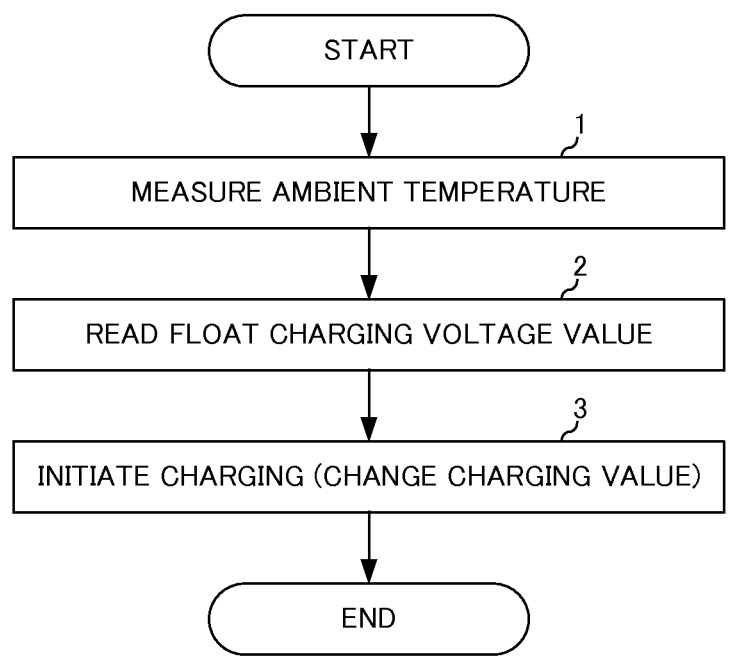
FIG. 4 is a flowchart used to describe a charging method in the first exemplary embodiment illustrated in FIG. 2.

FIG. 4 is a flowchart used to describe the charging method in the first exemplary embodiment illustrated in FIG. 2.

When battery 200 is charged by charging apparatus 100, the ambient temperature of battery 200 is measured first by temperature measurer 110 in step 1.

Then, the measured temperature is notified from temperature measurer 110 to controller 130. Thus, a voltage value (float charging voltage value in the example shown in FIG. 3) corresponding to the temperature is read out from storage device 120 by controller 130 in step 2.

The voltage value read out from storage device 120 by controller 130 is notified from controller 130 to charger 140. Thus, charging to battery 200 is initiated by charger 140 at the voltage value in step 3. If any voltage value is preset already at this time, the preset voltage value is changed to the voltage value (charging value) notified from controller 130. Thus, charging to battery 200 is initiated at the changed voltage value.

Temperatures may be correlated with SOCs (States Of Charge) to store the correlation in storage device 120 illustrated in FIG. 2. Each of these SOCs shows a state of charge (discharge) of battery 200 and serves as a guide to knowing the remaining capacity and charging capacity of battery 200. An SOC may in some cases be represented as a ratio (%) to the allowable charging voltage value (maximum voltage value at which charging can be performed) of battery 200.

FIG. 5 is a drawing illustrating one example of the correlation between temperatures and SOCs stored in storage device 120 illustrated in FIG. 2.

In this case, a plurality of temperature ranges is correlated with SOCs to store the correlation in storage device 120 illustrated in FIG. 2, as shown in FIG. 5.

For example, a temperature range lower than 30° C. is correlated with an SOC of 93% to store the correlation. Likewise, a temperature range from 30° C. to lower than 40° C. is correlated with an SOC of 98% and the correlation is stored. Yet likewise, a temperature range of 40° C. and higher is correlated with an SOC of 100% and the correlation is stored. From these correlations, an SOC is read out by controller 130 according to a temperature value.

In this case, a calculation is made using the SOC read out by controller 130. Details on this calculation will be described later.

Hereinafter, a description will be made of a charging method in the first exemplary embodiment in a case where storage device 120, in which the correlations shown in FIG. 5 are stored, is used.

Figure 6:
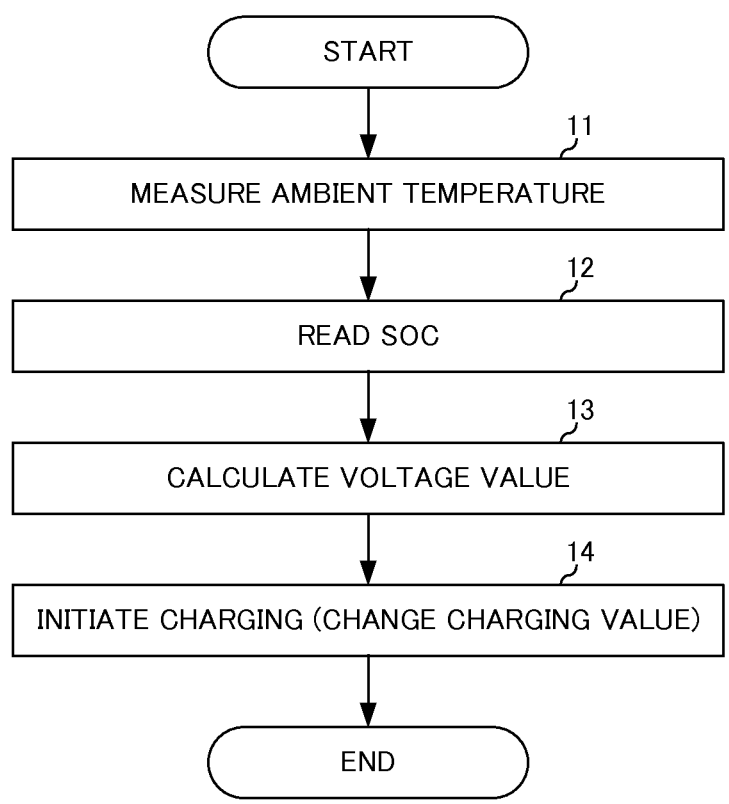
FIG. 6 is a flowchart used to describe the charging method in the first exemplary embodiment when a storage device in which the correlation shown in FIG. 5 is stored is used.

FIG. 6 is a flowchart used to describe the charging method in the first exemplary embodiment when storage device 120, in which the correlations shown in FIG. 5 are stored, is used.

When battery 200 is charged by charging apparatus 100, the ambient temperature of battery 200 is measured first by temperature measurer 110 in step 11.

Then, the measured temperature is notified from temperature measurer 110 to controller 130. Thus, an SOC corresponding to the temperature is read out from storage device 120 by controller 130 in step 12.

Subsequently, the SOC read out from storage device 120 by controller 130 is multiplied by the allowable charging voltage value of battery 200. That is, a product of the SOC read out from storage device 120 by controller 130 and the allowable charging voltage value of battery 200 is calculated as a voltage value in step 13.

Hereinafter, a method of calculating this voltage value will be described by citing a specific example. Note that here, a description will be made by citing an example in which the allowable charging voltage value is 4.2 V.

For example, if the temperature value notified from temperature measurer 110 is 25° C., an SOC of 93% correlated with a temperature range lower than 30° C. is read out from storage device 120 by controller 130 since the temperature value 25° C. belongs to the temperature range lower than 30° C. in storage device 120. Then, a product of the read-out SOC and the allowable charging voltage value (93%×4.2 V=3.9 V) is calculated by controller 130 as a voltage value. Likewise, if the temperature value notified from temperature measurer 110 is 35° C., an SOC of 98% correlated with the temperature range from 30° C. to lower than 40° C. is read out from storage device 120 by controller 130 since the temperature value 35° C. belongs to the temperature range from 30° C. to lower than 40° C. in storage device 120. Then, a product of the read-out SOC and the allowable charging voltage value (98%×4.2 V=4.1 V) is calculated by controller 130 as a voltage value. Yet likewise, if the temperature value notified from temperature measurer 110 is 45° C., an SOC of 100% correlated with the temperature range of 40° C. and higher is read out from storage device 120 by controller 130 since the temperature value 45° C. belongs to the temperature range of 40° C. and higher in storage device 120. Then, a product of the read-out SOC and the allowable charging voltage value (100%×4.2 V=4.2 V) is calculated by controller 130 as a voltage value.

The voltage values calculated by controller 130 are notified from controller 130 to charger 140.

Then, charging to battery 200 is initiated by charger 140 at the voltage value notified from controller 130. If any voltage value is preset already at this time, the preset voltage value is changed to the voltage value (charging value) notified from controller 130. Thus, charging to battery 200 is initiated at the changed voltage value.

Battery life can be extended by varying the charging voltage value of battery 200 in this way according to the ambient temperature of battery 200, in particular, by charging battery 200 at a higher charging voltage value in accordance with a higher ambient battery temperature.

Second Exemplary Embodiment

Figure 7:
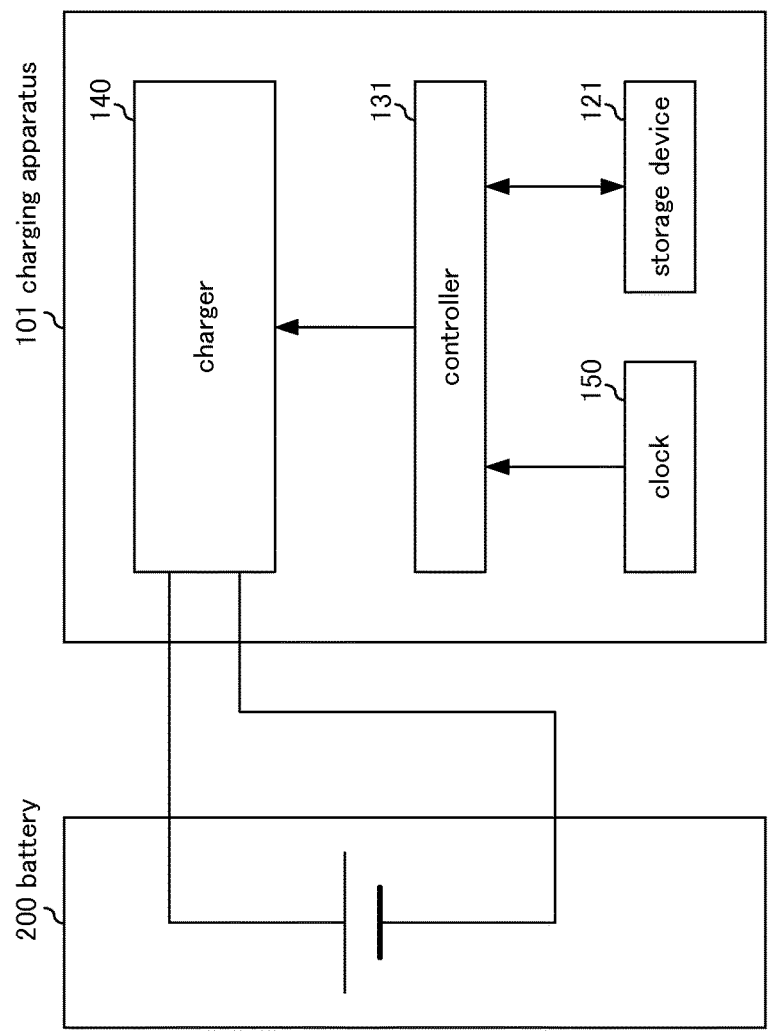
FIG. 7 is a drawing illustrating a second exemplary embodiment of the charging apparatus of the present invention.

FIG. 7 is a drawing illustrating a second exemplary embodiment of the charging apparatus of the present invention.

As illustrated in FIG. 7, charging apparatus 101 of the present exemplary embodiment is provided with clock 150, storage device 121, controller 131, and charger 140. In addition, charging apparatus 101 is connected to rechargeable battery 200.

Clock 150 indicates the current month (January to December). Note that clock 150 may be a commonly-used clock for measuring time, but is essentially provided with a function to indicate the month.

Storage device 121 correlates months (January to December) with voltage values at which a battery is charged to store the correlation. This correlation is written into storage device 121 from the outside in advance. Note that in general, storage device 121 correlates high voltage values with hot summer months to store the correlation. In contrast, storage device 121 generally correlates low voltage values with cold winter months and the correlation is stored.

FIG. 8 is a drawing illustrating one example of the correlation between months and voltage values stored in the storage device illustrated in FIG. 7. Here, a description will be made by citing an example in which the voltage values are float charging voltage values.

As illustrated in FIG. 8, groups of pluralities of months are correlated with float charging voltage values to store the correlation in storage device 121 illustrated in FIG. 7.

For example, December, January, February and March are correlated with a float charging voltage value of 3.9 V and the correlation is stored. Likewise, April, May, October and November are correlated with a float charging voltage value of 4.1 V and the correlation is stored. Yet likewise, June, July, August and September are correlated with a float charging voltage value of 4.2 V and the correlation is stored. From these correlations, a float charging voltage value is read out by controller 130 according to a month.

Controller 131 reads out a voltage value (float charging voltage value in the example shown in FIG. 8) corresponding to the current month indicated by clock 150 from storage device 120.

For example, if the current month indicated by clock 150 is January, a float charging voltage value of 3.9 V correlated with January is read out. Likewise, if the current month indicated by clock 150 is February, a float charging voltage value of 3.9 V correlated with February is read out. Yet likewise, if the current month indicated by clock 150 is March, a float charging voltage value of 3.9 V correlated with March is read out. Still likewise, if the current month indicated by clock 150 is April, a float charging voltage value of 4.1 V correlated with April is read out. Still likewise, if the current month indicated by clock 150 is May, a float charging voltage value of 4.1 V correlated with May is read out. Still likewise, if the current month indicated by clock 150 is June, a float charging voltage value of 4.2 V correlated with June is read out. Still likewise, if the current month indicated by clock 150 is July, a float charging voltage value of 4.2 V correlated with July is read out. Still likewise, if the current month indicated by clock 150 is August, a float charging voltage value of 4.2 V correlated with August is read out. Still likewise, if the current month indicated by clock 150 is September, a float charging voltage value of 4.2 V correlated with September is read out. Still likewise, if the current month indicated by clock 150 is October, a float charging voltage value of 4.1 V correlated with October is read out. Still likewise, if the current month indicated by clock 150 is November, a float charging voltage value of 4.1 V correlated with November is read out. Still likewise, if the current month indicated by clock 150 is December, a float charging voltage value of 3.9 V correlated with December is read out.

Controller 131 notifies a voltage value read out from storage device 121 to charger 140.

Charger 140 charges battery 200 at the voltage value notified from controller 131.

Hereinafter, a description will be made of a charging method in the second exemplary embodiment.

Figure 9:
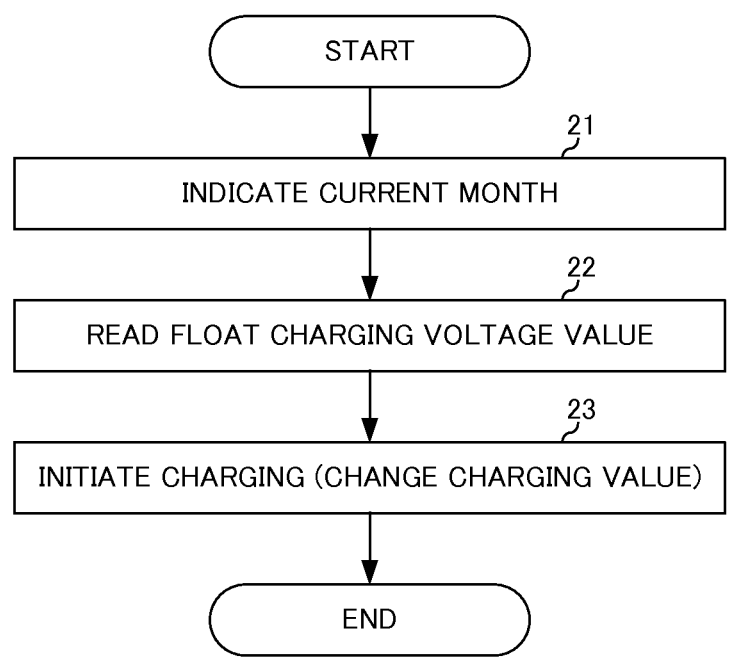
FIG. 9 is a flowchart used to describe a charging method in the second exemplary embodiment illustrated in FIG. 7.

FIG. 9 is a flowchart used to describe the charging method in the second exemplary embodiment illustrated in FIG. 7.

In step 21, the current month is constantly indicated by clock 150.

When battery 200 is charged by charging apparatus 101, a voltage value (float charging voltage value in the example shown in FIG. 8) corresponding to the current month indicated by clock 150 is read out from storage device 121 by controller 131 in step 22.

The voltage value read out from storage device 121 by controller 131 is notified from controller 131 to charger 140. Thus, charging to battery 200 is initiated by charger 140 at the voltage value in step 23. If any voltage value is already preset at this time, the preset voltage value is changed to the voltage value (charging value) notified from controller 131. Thus, charging to battery 200 is initiated at the changed voltage value.

Months may be correlated with SOCs (States Of Charge) and the correlation is stored in storage device 121 illustrated in FIG. 7. These SOCs are those described in the first exemplary embodiment.

FIG. 10 is a drawing illustrating one example of the correlation between months and SOCs stored in storage device 121 illustrated in FIG. 7.

In this case, months are correlated with SOCs and the correlation is stored in storage device 121 illustrated in FIG. 7, as shown in FIG. 10.

For example, December, January, February and March are correlated with an SOC of 93% and the correlation is stored. Likewise, April, May, October and November are correlated with an SOC of 98% and the correlation is stored. Yet likewise, June, July, August and September are correlated with an SOC of 100% and the correlation is stored. From these correlations, an SOC is read out by controller 131 according to a month.

In this case, a calculation is made using the SOC read out by controller 131. Details on this calculation will be described later.

Hereinafter, a description will be made of a charging method in the second exemplary embodiment in a case where storage device 121, in which the correlations shown in FIG. 10 are stored, is used.

Figure 11:
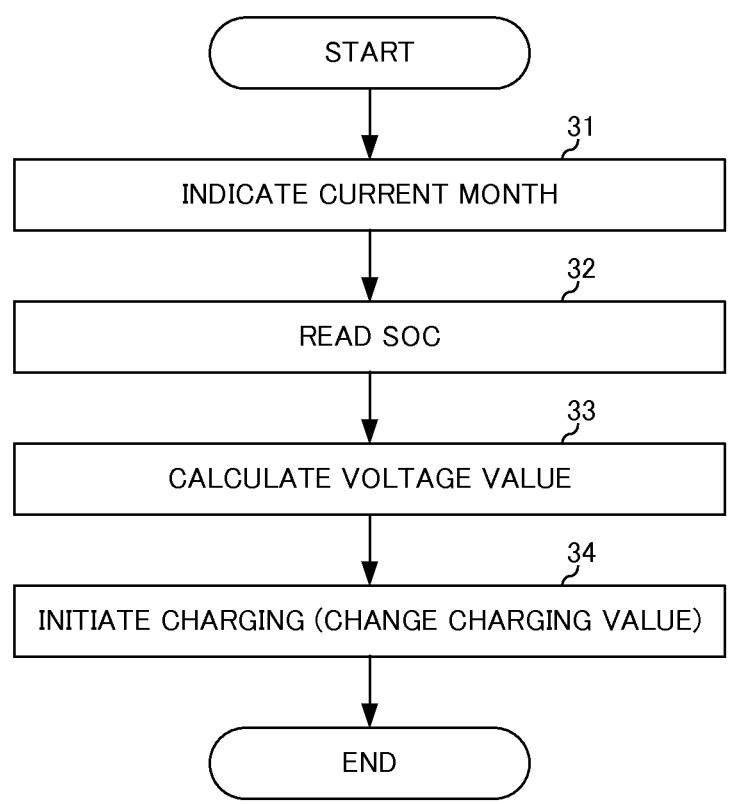
FIG. 11 is a flowchart used to describe the charging method in the second exemplary embodiment when a storage device in which the correlation shown in FIG. 10 is stored is used.

FIG. 11 is a flowchart used to describe the charging method in the second exemplary embodiment when storage device 121, in which the correlations shown in FIG. 10 are stored, is used.

In step 31, the current month is constantly indicated by clock 150.

When battery 200 is charged by charging apparatus 101, an SOC corresponding to the current month indicated by clock 150 is read out from storage device 121 by controller 131 in step 32.

Subsequently, the SOC read out from storage device 120 by controller 131 is multiplied by the allowable charging voltage value of battery 200. That is, a product of the SOC read out from storage device 121 by controller 131 and the allowable charging voltage value of battery 200 is calculated as a voltage value in step 33.

Hereinafter, a method of calculating this voltage value will be described by citing a specific example. Note that here, a description will be made by citing an example in which the allowable charging voltage value is 4.2 V.

For example, if the current month indicated by clock 150 is January, an SOC of 93% correlated with January is read out from storage device 121 by controller 131. Then, a product of the read-out SOC and the allowable charging voltage value (93%×4.2 V=3.9 V) is calculated by controller 131 as a voltage value. Likewise, if the current month indicated by clock 150 is February, an SOC of 93% correlated with February is read out from storage device 121 by controller 131. Then, a product of the read-out SOC and the allowable charging voltage value (93%×4.2 V=3.9 V) is calculated by controller 131 as a voltage value. Yet likewise, if the current month indicated by clock 150 is March, an SOC of 93% correlated with March is read out from storage device 121 by controller 131. Then, a product of the read-out SOC and the allowable charging voltage value (93%×4.2 V=3.9 V) is calculated by controller 131 as a voltage value. Still likewise, if the current month indicated by clock 150 is April, an SOC of 98% correlated with April is read out from storage device 121 by controller 131. Then, a product of the read-out SOC and the allowable charging voltage value (98%×4.2 V=4.1 V) is calculated by controller 131 as a voltage value. Still likewise, if the current month indicated by clock 150 is May, an SOC of 98% correlated with May is read out from storage device 121 by controller 131. Then, a product of the read-out SOC and the allowable charging voltage value (98%×4.2 V=4.1 V) is calculated by controller 131 as a voltage value. Still likewise, if the current month indicated by clock 150 is June, an SOC of 100% correlated with June is read out from storage device 121 by controller 131. Then, a product of the read-out SOC and the allowable charging voltage value (100%×4.2 V=4.2 V) is calculated by controller 131 as a voltage value. Still likewise, if the current month indicated by clock 150 is July, an SOC of 100% correlated with July is read out from storage device 121 by controller 131. Then, a product of the read-out SOC and the allowable charging voltage value (100%×4.2 V=4.2 V) is calculated by controller 131 as a voltage value. Still likewise, if the current month indicated by clock 150 is August, an SOC of 100% correlated with August is read out from storage device 121 by controller 131. Then, a product of the read-out SOC and the allowable charging voltage value (100%×4.2 V=4.2 V) is calculated by controller 131 as a voltage value. Still likewise, if the current month indicated by clock 150 is September, an SOC of 100% correlated with September is read out from storage device 121 by controller 131. Then, a product of the read-out SOC and the allowable charging voltage value (100%×4.2 V=4.2 V) is calculated by controller 131 as a voltage value. Still likewise, if the current month indicated by clock 150 is October, an SOC of 98% correlated with October is read out from storage device 121 by controller 131. Then, a product of the read-out SOC and the allowable charging voltage value (98%×4.2 V=4.1 V) is calculated by controller 131 as a voltage value. Still likewise, if the current month indicated by clock 150 is November, an SOC of 98% correlated with November is read out from storage device 121 by controller 131. Then, a product of the read-out SOC and the allowable charging voltage value (98%×4.2 V=4.1 V) is calculated by controller 131 as a voltage value. Still likewise, if the current month indicated by clock 150 is December, an SOC of 93% correlated with December is read out from storage device 121 by controller 131. Then, a product of the read-out SOC and the allowable charging voltage value (93%×4.2 V=3.9 V) is calculated by controller 131 as a voltage value.

The voltage values calculated by controller 131 are notified from controller 131 to charger 140.

Then, charging to battery 200 is initiated by charger 140 at the voltage value notified from controller 131 in step 34. If any voltage value is already preset at this time, the preset voltage value is changed to the voltage value (charging value) notified from controller 131. Thus, charging to battery 200 is initiated at the changed voltage value.

Note that a voltage value according to a time slot rather than a voltage value according to a month may be used.

Battery life can be extended by utilizing the current month to vary the charging voltage value of battery 200 in this way according to four seasons different in temperature (atmospheric temperature) from one another, in particular, by charging battery 200 at a higher charging voltage value in accordance with a higher atmospheric temperature of a month (season).

Note that in the first and second exemplary embodiments, descriptions have been made by citing examples in which one battery 200 is included. Alternatively, however, the first and second exemplary embodiments may be such that a plurality of batteries is connected in series. In that case, it is needless to say that the battery is charged by charger 140 at a voltage corresponding to "one float charging voltage value×number of batteries."

Battery life can be extended by controlling a float charging voltage value and a sustaining/standby voltage value as well, according to temperature conditions.

As described above, a system can be configured to reduce deterioration by monitoring temperature and voltage and thus the operating temperature environment, on which deterioration is dependent, with a focus on the most recent deterioration in the positive electrode. It is also possible to prevent cost and volume increases.

Battery prices per unit of storage capacity worsen when a technique is used in which voltage varies between the initial and terminal stage. In contrast, more effective energy management can be considered in an initial stage at which high capacity is retained and the early realization of energy cost recovery can be expected by continuing to maintain average capacity by taking into account the effects by the four seasons and temperature variations between the day and night times throughout the year.

Processes performed by the respective components provided in charging apparatuses 100 and 101 described above may alternatively be performed using logic circuits created according to the purposes thereof. Yet alternatively, the processes may be performed by recording a program describing processing contents on a recording medium readable to charging apparatuses 100 and 101 and allowing the program recorded on this recording medium to be read and executed by charging apparatuses 100 and 101. The recording medium readable to charging apparatuses 100 and 101 refers to a memory, such as a ROM or a RAM, or an HDD built into each of charging apparatuses 100 and 101, in addition to a transferable recording medium, such as a floppy (registered trademark) disk, a magnetooptical disk, a DVD or a CD. The program recorded on this recording medium is read by a CPU (not illustrated) provided in each of charging apparatuses 100 and 101. Thus, the same processes as described above are performed under the control of the CPU. Here, the CPU operates as a computer for executing the program read from a recording medium on which the program is recorded.

Having thus described the present invention with reference to the exemplary embodiments thereof, the present invention is not limited to the above-described exemplary embodiments. Alternatively, various modifications understandable to those skilled in the art may be made to the constitution and details of the present invention within the scope thereof.

This application claims the right of priority based on Japanese Patent Application No. 2010-229691, filed on Oct. 12, 2010, which is hereby incorporated by reference herein in its entirety.

The invention claimed is:

1. A charging apparatus for charging a battery, the apparatus comprising:
    a temperature measurer that measures an ambient temperature of the battery;
    a storage device that correlates the ambient temperature with a float charging voltage value in advance and stores the correlation;
    a controller that reads out the float charging voltage value correlated with the temperature measured by said temperature measurer from said storage device; and
    a charger that charges the battery at the float charging voltage value read out by said controller,
    wherein said storage device stores a first voltage value as the float charging voltage value correlated with a first temperature, a second voltage value greater than the first voltage value as the float charging voltage value correlated with a second temperature greater than the first temperature, and a third voltage value greater than the second voltage value as the float charging value correlated with a third temperature greater than the second temperature.

2. The charging apparatus according to claim 1, wherein said storage device stores float charging voltage values correlated respectively with a plurality of temperature ranges.

3. The charging apparatus according to claim 1, wherein said storage device stores the float charging voltage value of the battery.

4. The charging apparatus according to claim 1, wherein said storage device stores a sustaining/standby voltage value of the battery as the float charging voltage value.

5. The charging apparatus according to claim 1,
    wherein said storage device stores an SOC in place of the float charging voltage value,
    said controller reads out the SOC correlated with the temperature measured by said temperature measurer from said storage device and calculates a product of the read-out SOC and an allowable charging voltage value of the battery as the float charging voltage value, and
    said charger charges the battery at the float charging voltage value calculated by said controller.

6. A charging apparatus for charging a battery, the apparatus comprising:
    a clock that indicates a current month;
    a storage device that correlates the current month with a float charging voltage value in advance and stores the correlation;
    a controller that reads out the float charging voltage value correlated with the current month indicated by said clock from said storage device; and
    a charger that charges the battery at the float charging voltage value read out by said controller,
    wherein said storage device stores a first voltage value as the float charging voltage value correlated with a first month, a second voltage value greater than the first voltage value for a second month hotter than the first month as the float charging voltage value correlated with the second month, and a third voltage value greater than the second voltage value as the float charging value correlated with a third month hotter than the second month.

7. A charging method of charging a battery, the method comprising the steps of:
    measuring an ambient temperature of the battery; and
    charging the battery at a float charging value correlated with the measured temperature,
    wherein said charging step charges the battery at a first voltage value as the float charging voltage value corresponding to a first temperature, a second voltage value greater than the first voltage value as the float charging voltage value corresponding to a second temperature greater than the first temperature, and a third voltage value greater than the second voltage value as the float charging value corresponding to a third temperature greater than the second temperature.

8. The charging method according to claim 7, wherein said charging step charges the battery at a float charging voltage value correlated with a temperature range in which the measured temperature is included.

9. The charging method according to claim 7, wherein said charging step uses a float charging voltage value of the battery as the float charging voltage value.

10. The charging method according to claim 7, wherein said charging step uses a sustaining/standby voltage value of the battery as the float charging voltage value.

11. The charging method according to claim 7, wherein said charging step uses an SOC in place of the float charging voltage value and charges the battery at a voltage value calculated by multiplying the SOC correlated with the measured temperature by an allowable charging voltage value of the battery.

12. The charging method according to claim 7, wherein said charging step charges the battery at a voltage value correlated with the current month.

* * * * *